United States Patent [19]

Frick

[11] Patent Number: 4,523,729
[45] Date of Patent: Jun. 18, 1985

[54] RETRIEVING AND/OR LAUNCHING SYSTEM

[75] Inventor: Heinz E. Frick, Storrington, United Kingdom

[73] Assignee: British Aerospace Public Limited Company, London, England

[21] Appl. No.: 384,385

[22] Filed: Jun. 2, 1982

[30] Foreign Application Priority Data

Jun. 4, 1981 [GB] United Kingdom ............... 8117085

[51] Int. Cl.³ .......................... B64F 1/04; B64F 1/12
[52] U.S. Cl. .......................... 244/115; 244/63/135 A
[58] Field of Search ............... 244/114 R, 116, 63, 244/115, 137, 135 A, 161; 114/261; 212/238, 261

[56] References Cited

U.S. PATENT DOCUMENTS

| | | | |
|---|---|---|---|
| 1,842,432 | 1/1932 | Stanton | 244/63 |
| 2,286,381 | 6/1942 | Rubissow | 244/63 |
| 2,939,657 | 6/1960 | Westcott, Jr. | 244/115 |
| 4,025,193 | 5/1977 | Pond et al. | 244/135 A |
| 4,184,655 | 1/1980 | Anderberg | 244/114 R |
| 4,236,686 | 12/1980 | Barthelme et al. | 114/261 |
| 4,327,784 | 5/1982 | Denniston | 114/261 |

Primary Examiner—Galen L. Barefoot
Assistant Examiner—Rodney Corl
Attorney, Agent, or Firm—Cushman, Darby and Cushman

[57] ABSTRACT

A system for retrieval and/or launching an aircraft capable of hovering flight (for example an aircraft having a thrust vectoring capability or a helicopter) includes gantry means 3, 5 for mounting on a surface station (for example a naval vessel 1), and an aircraft capable of hovering in a stationary position with respect to the gantry. The gantry and the aircraft are provided with complementary engagement means 9, 10 which are releasably engageable to allow the whole of the weight of the aircraft to be carried by the gantry. The engagement means on the aircraft are provided in the region of its center of gravity. In a retrieval sequence, the aircraft hovers with its engagement means 10 within a notional window with respect to the engagement means 9 of the gantry and the engagement means are then engaged.

14 Claims, 7 Drawing Figures

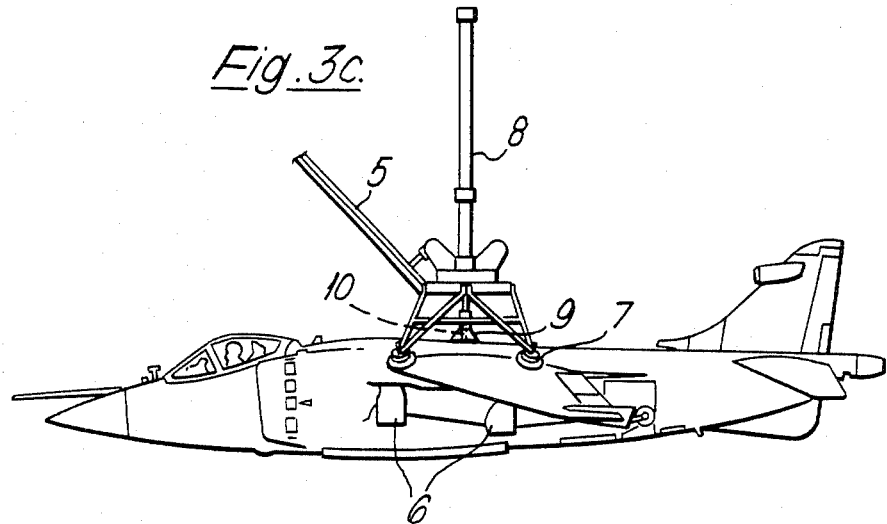
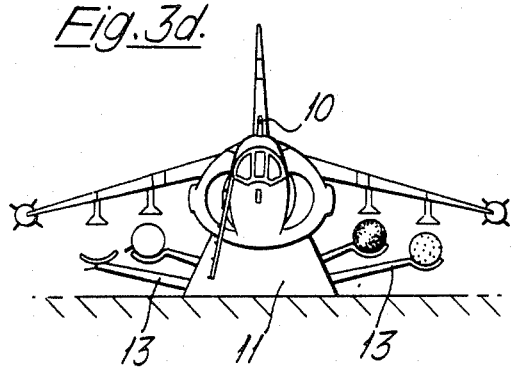
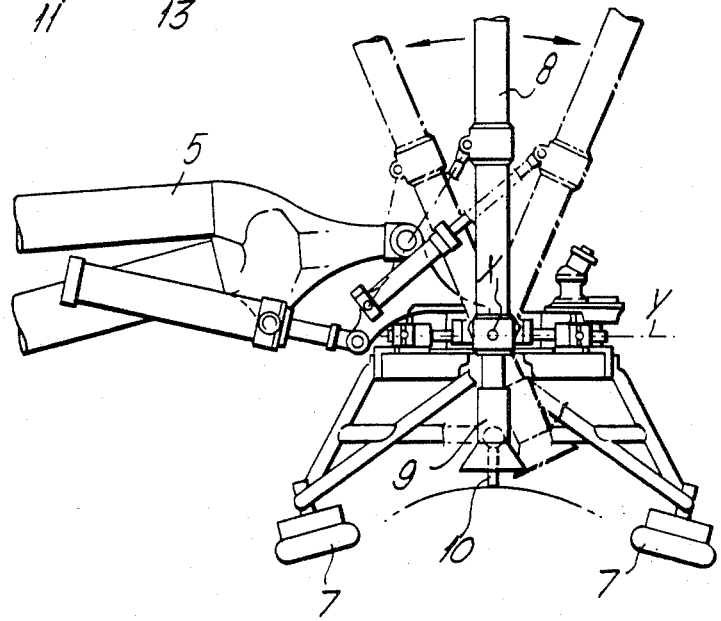

RETRIEVING AND/OR LAUNCHING SYSTEM

This invention relates to systems for the retrieving and/or launching of those aircraft capable of very low speed or hovering flight, for example those jet thrust supported aircraft having a thrust vectoring capability in which the thrust can be directed rearwardly for propulsion purposes, or downwardly for lift purposes, or a combination of both, or rotor-craft such as helicopters.

Jet thrust supported aircraft have operational problems in VTOL (vertical take-off and landing) conditions in both land based and naval operations caused by recirculatory ground effects resulting in re-ingestion of exhaust gases by the engines when near the landing surface. This results in substantial loss of power and also in serious overheating of the engines. Similarly, helicopters are subject to ground effects resulting in recirculation of the rotor efflux. It is therefore desirable to arrange aircraft launch and/or retrieval in conditions where such ground effects are at least reduced.

Quite apart from the problems due to ground effects, there are severe difficulties in landing an aircraft on the deck of a naval vessel due to the roll, pitch, heave and sway of the vessel.

Additionally, in naval operations there is the prime disadvantage of the cost of the specialised vessels required to operate aircraft. This is particularly so when non-V/STOL operations are envisaged but is also true when V/STOL aircraft or helicopters are operated; even in the latter cases vessels need relatively large uncluttered deck space for successful operation and require to be sized and specially designed accordingly. These specialised vessels are therefore costly, vulnerable to attack, and are limited in the range of tasks they can be expected to perform.

It is an objective of the present invention not only to provide systems for retrieving and/or launching an aircraft in conditions where ground effects may at least be reduced but also to provide systems which, in naval conditions, also allow that deck space devoted to aircraft operations to be limited to that associated with the storage, maintenance, and re-arming of the aircraft.

According to one aspect of this invention, there is provided a system for retrieving and/or launching an aircraft including gantry means adapted for mounting on a surface station, an aircraft capable of hovering in a substantially stationary position with respect to the gantry means, releasable engagement means adapted to allow substantially the whole of the weight of the aircraft to be carried by the gantry means, the releasable engagement means including a pair of complementary engagement members one provided on the aircraft in the region of its centre of gravity and the other provided on the gantry means, the system being arranged such that a carried aircraft when released by disengagement of the engagement members can adopt an in-flight self-supported station-keeping position, and such that an aircraft to be carried having adopted said station-keeping position, can be retrieved from said position for carrying engagement by the engagement means.

Where the system is to be used with an aircraft having efflux means for effecting jet thrust supported flight, the engagement member of the aircraft is preferably directed generally upwardly and the engagement means of the gantry is preferably directed generally downwardly. In this instance, the station-keeping position of the aircraft is advantageously at a flight level wherein re-ingestion of the jet efflux is at least reduced.

The gantry means may be adapted for mounting on a surface vehicle, for example a naval vessel; alternatively it may be adapted for mounting on an elevated fixed base.

Conveniently, the gantry extends, and the downwardly directed engagement means lies, in a position outboard of the vehicle or fixed base, and particularly, but not exclusively in the case of a naval vessel, the gantry may be swung between an inboard position in which the aircraft can be lifted from or deposited in a storage position and said outboard position. In a naval vessel, this feature makes use of the distance between the deck and the surface of the sea.

The gantry preferably includes stabilising means operable to maintain the position of the downwardly directed engagement means in space.

The engagement means of the gantry conveniently includes urging means for effecting relative movement generally vertically into aircraft-carrying engagement with the engagement means of the aircraft, and location means may be provided against which the aircraft is drawn for substantially rigid location subsequent to carrying engagement by the engagement means.

Advantageously, the engagement means of the gantry are mounted for pivotting movement with respect to the gantry, and sensing means are provided for sensing the position of the engagement means of the aircraft, and guiding the engagement means of the gantry into engagement therewith.

According to another aspect of this invention, there is provided a method of launching the aircraft of the system of this invention including the steps of effecting a hovering thrust supported condition of the carried aircraft, dis-engaging the associated engagement means, subsequently causing the aircraft to fly clear of the gantry means.

According to yet a further aspect of this invention, there is provided a method of retrieving the aircraft of this invention including the steps of causing the aircraft to approach the gantry means, causing the aircraft to temporarily adopt the in-flight thrust supported station-keeping position, engaging the engagement means, and terminating the supporting thrust.

Further aspects of the invention will become apparent from one embodiment of the invention which is described by way of example with reference to the accompanying drawings in which.

Figure 1:
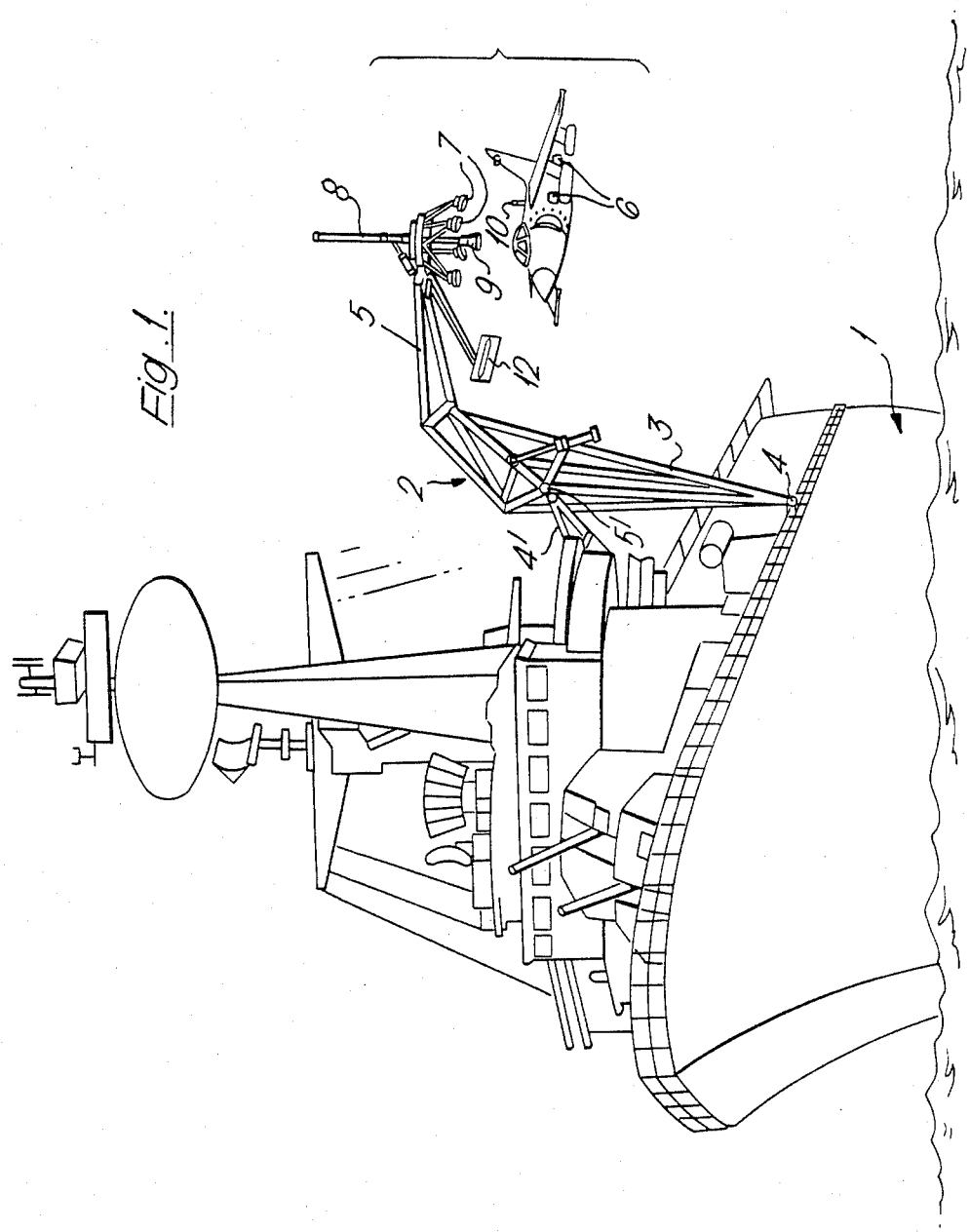
FIG. 1 illustrates, pictorially, a surface vessel with aircraft retrieving and/or launching system in naval use.
Figure 3A:
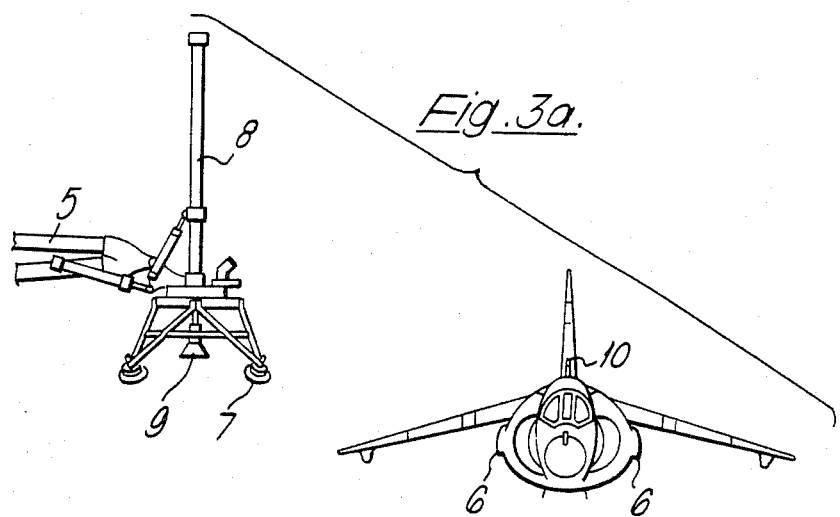

FIGS. 3a, b, c, d, illustrate aircraft engagement means being part of the system of FIG. 1 and also illustrate a retrieval sequence, and FIG. 4 is a view on an enlarged scale of the aircraft engagement means included in FIGS. 3a, b, c and d.

In this specification, any terms relating to direction, e.g. forwards, rearwards, upwards, and downwards relate to vehicles in a generally straight and level attitude.

Referring to the Figures, an aircraft retrieving and/or launching system is shown generally at 2. The system includes gantry means in the form of a pillar 3, supported at 4 and 4' by a naval vessel 1, and pivotally carrying an arm 5 at 5' for nodding movement. The arm 5 carries at or near its free end, downwardly directed engagement means in the form of an acquisition ram 8. The acquisition ram 8 is positively movable upwards and downwards with reference to the arm 5 and has at its lower end a receiver 9 of inverted funnel shape. An upwardly directed engagement means in the form of a probe 10 of suitable profile protrudes upwards from an aircraft to be retrieved which probe can be accepted in a collet lock arrangement. The aircraft includes efflux means 6 vectorable to provide both lift and propulsion thrust. The receiver 9 houses locking means, not shown, in the form of a releasable bayonet or collet fitting which lock on to the probe 10 and anchor it to the receiver 9. In such an anchored condition the retrieved aircraft is carried by the apparatus which must accordingly be designed to bear the full dead weight of such an aircraft. Aircraft location pads 7 are provided around the ram 8.

The ram 8 is pivotally mounted at the end of arm 5 about two orthogonal horizontal axes X and Y and rams are provided to effect movement in these senses; these degrees of freedom, together with provision of upward and downward movement of arm 8 define a notional window within which a probe 10 may be acquired and locked. The aircraft and the gantry are preferably provided with an associated control system to control movement of the acquisition ram 8 to ensure that when an aircraft is formating with its probe 10 within the window, the acquisition ram homes in on the probe 10 irrespective of movement of the aircraft within the window.

The downwards movement of the acquisition ram 8 is such as to cause the receiver 9 to receive and lock on to the probe 10 of an aircraft hovering below; the force effecting such movement is therefore positive, but not such as to damage or to greatly displace the hovering aircraft. The force of the upward movement must be such as to bodily carry the aircraft upwards into stabilising engagement with the location pads 7, although a large proportion of the mass of the aircraft may still be supported by the lift-generating means of the aircraft.

It is envisaged that the gantry means has the ability to compensate for the movements of the vessel in roll, pitch, heave and sway. Such ability can be provided in the form of hydraulic jacks 14, only one of which is shown, which cause the arm 5 to tilt about 5' with respect to the pillar 3. The effect in either case is to stabilise the engaging means in space irrespective of vessel movement. Space-stabilising movement of the engagement means may be controlled by an inertial platform associated with the navigation system of the vessel.

Figure 2:
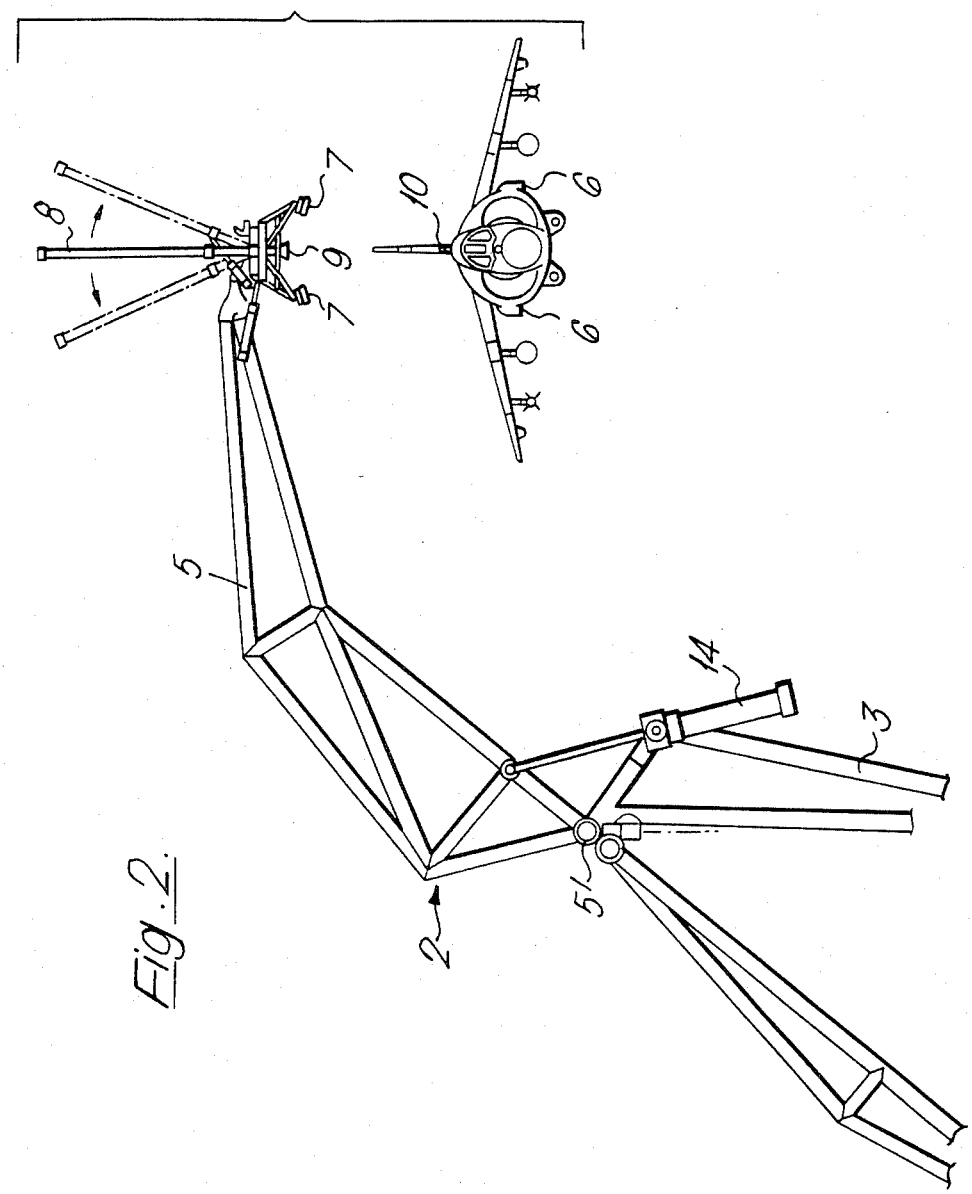
FIG. 2 illustrates, diagrammatically, the same subject as FIG. 1.

The arm 5 can be swung inboard from the position illustrated in FIGS. 1 and 2 so that a retrieved aircraft can be placed upon the vessel deck. As this action occurs, the gantry is controlled gradually to become ship, rather than space, stabilised.

One corollary to this invention is that the aircraft need have no undercarriage of the type necessary to absorb landing and take-off loads. In this case, the aircraft is laid to rest on trestles 11 which can themselves have ground transport wheels. Such wheels may allow free movement or movement constrained by guides formed on the deck of the vessel. Alternatively, the aircraft can have ground transport wheels not adapted for the high loads of landing and therefore of relatively light weight. Irrespectively, the aircraft can be made much more simple, can be of lighter weight, and therefore be less expensive. The saving in weight can be converted into increased payload/range performance.

The system is applicable to land based as well as naval operations. In a land based situation, the gantry could be mounted at one edge of an aircraft hangar to give sufficient height to avoid exhaust re-ingestion problems; it naturally would require no stabilisation although it would be otherwise similar. Thus in FIG. 2 the naval vessel would be replaced by a fixed structure, for example the aircraft hangar to which reference has been made.

Moreover, in a naval situation the apparatus could be used on a submersible vessel.

Preferably, the probe 10 is mounted on the aircraft as close to the aircraft centre of gravity as possible. It may be retractable. Naturally, if the aircraft design allowed, the probe 10 could be carried upon the acquisition ram 8 and the receiver 9 located within the aircraft. The positioning of the probe 10 adjacent the centre of gravity of the aircraft allows flight control when the probe 10 has been acquired by receiver 9, but before the aircraft has been drawn against location pads 7.

The gantry could be fitted with fluid transfer apparatus for example for re-fuelling an aircraft without actually placing the aircraft on the ground or on the vessel deck.

In operation, assuming the gantry to be positioned as illustrated in FIGS. 1 and 2, an aircraft to be retrieved formates as shown in FIG. 3a, that is to say slightly lower than, slightly to the rear of, and slightly to one side of the engaging means. It is envisaged that a pilot will initially formate with the vessel, (if in a naval operation), irrespective of the motions of the vessel. Subsequently he will then formate on the engaging means which is space stabilised.

Since, as illustrated, the probe 10 protrudes upwards at the aircraft centre of gravity, it is behind the pilot and he therefore requires some help in the subsequent accurate positioning of his aircraft below the receiver 9. One envisaged solution is to provide a marker board 12 in the pilot's view. This can be cantilevered from the stabilised engagement means. The pilot can therefore align a part of his aircraft with the markings on the board so that correct positioning of the aircraft and hence the proble 10 in both plan and elevation can be assured. This is an in flight jet thrust supported station-keeping position.

Figure 3B:
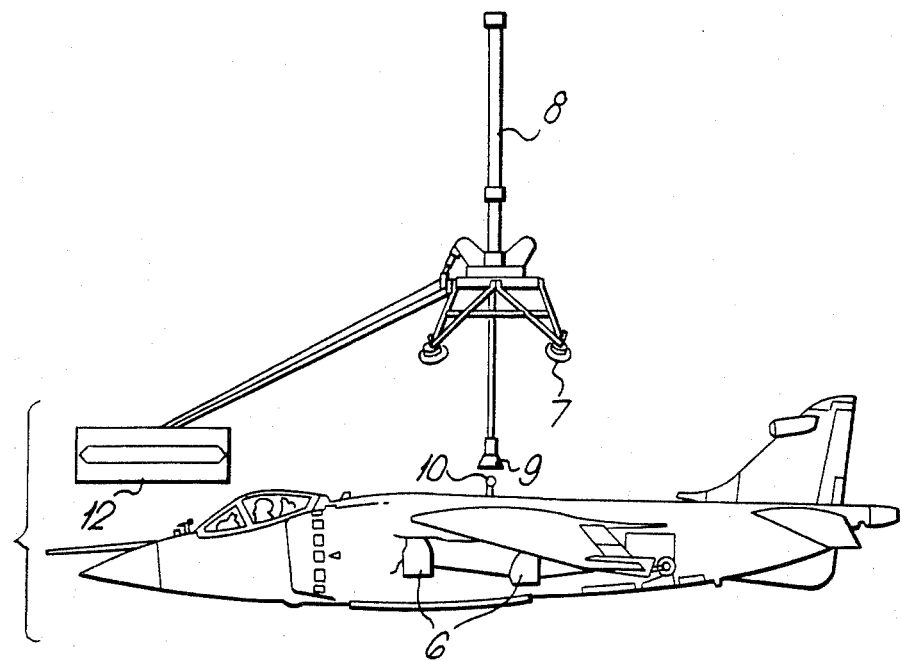

At this stage, illustrated in FIG. 3b, the acquisition ram 8 is signalled to be lowered and the probe 10 is received and locked into the receiver 9 for aircraft carrying engagement. The pilot then reduces jet thrust, thereby imparting a load to ram 8 whilst still maintaining a degree of jet thrust flight control over the aircraft. The increased load on ram 8 is sensed by a control system which causes the acquisition ram 8 to be raised and the aircraft to be bodily moved upwards to be engaged by the location pads 7 for stabilisation purposes. With the aircraft now rigidly positioned as shown in FIG. 3c, the powerplant is shut down and the marker board 12 is conveniently retracted.

The gantry is now caused gradually to become ship rather than space stabilised and the aircraft is swung inboard to rest it upon the trestles 11. These may be provided with store supports 13 to facilitate the reloading of the aircraft.

In order to launch an aircraft the gantry is ship stabilised and the receiver 9 secured to probe 10 of the aircraft for aircraft carrying engagement as shown in FIG. 3c but with the aircraft sitting upon a trestle 11. The aircraft is then lifted by the gantry and swung over-board whilst the gantry is caused to become space rather than ship stabilised. The powerplant of the aircraft is then actuated to provide a major portion of the lift required for support of the aircraft and also to allow a degree of control of movement of the aircraft by the pilot when ram 8 is lowered prior to release of the aircraft. The ram 8 is lowered and the pilot causes the powerplant to generate sufficient lift fully to support the aircraft and when no aircraft load is acting on ram 8, this condition is sensed by the control system which causes the receiver 9 to release probe 10 and the ram 8 subsequently to move upwardly. The pilot may then manoeuvre the aircraft away from the gantry.

Whilst the above embodiment is described with specific reference to an aircraft having a thrust vectoring capability it may be used with aircraft having a capability of rotor thrust supported flight, for example helicopters or tilt wing/tilt engine aircraft. In these cases, the gantry will be provided with an upwardly directed acquisition ram and the aircraft provided with downwardly directed engagement means. Consequently, for retrieval such an aircraft will formate at a position above the acquisition ram.

I claim:

1. The method of launching an aircraft in a system for launching and/or retrieving an aircraft, said system including:
   (i) gantry means having a base portion for attachment to a surface station and a distal portion,
   (ii) a longitudinally extensible member pivotally mounted on said distal portion,
   (iii) first actuation means operable to effect extension and contraction of said extensible member,
   (iv) second actuation means operable to effect pivotal movement of said extensible member with respect to said distal portion,
   (v) first complementary engagement means provided on the end region of said extensible member remote from the distal portion,
   (vi) an aircraft capable of hovering in a substantially stationary horizontal position with respect to said gantry means,
   (vii) second complementary engagement means provided on the aircraft in the region of its center of gravity adjacent the normal axis of the aircraft and being adapted for releasable engagement with said first complementary engagement means,
   (viii) control means for sensing the position of the second complementary engagement means when the aircraft is hovering in a predetermined acquisition region, and for operating said first and second actuation means to guide said first complementary engagement means into engagement with said second complementary engagement means, and
   (ix) location means against which the aircraft is drawn for substantially rigid location subsequent to carrying engagement by the complementary engagement means:
   the steps comprising:
   effecting a flight controllable condition of the aircraft while carried in the gantry means and drawn against the location means;
   actuating said first actuation means to cause the aircraft to be lowered to clear the location means while still maintaining the complementary engagement means engaged;
   effecting a hovering thrust supported condition of the carried aircraft;
   disengaging the complementary engagement means; and
   subsequently causing the aircraft to fly clear of the gantry means.

2. The method of retrieving an aircraft in a system for launching and/or retrieving an aircraft, said system including:
   (i) gantry means having a base portion for attachment to a surface station and a distal portion,
   (ii) a longitudinally extensible member pivotally mounted on said distal portion,
   (iii) first actuation means operable to effect extension and contraction of said extensible member,
   (iv) second actuation means operable to effect pivotal movement of said extensible member with respect to said distal portion,
   (v) first complementary engagement means provided on the end region of said extensible member remote from the distal portion,
   (vi) an aircraft capable of hovering in a substantially stationary horizontal position with respect to said gantry means,
   (vii) second complementary engagement means provided on the aircraft in the region of its center of gravity adjacent the normal axis of the aircraft and being adapted for releasable engagement with said first complementary engagement means, and
   (viii) control means for sensing the position of the second complementary engagement means when the aircraft is hovering in a predetermined acquisition region, and for operating said first and second actuation means to guide said first complementary engagement means into engagement with said second complementary engagement means:
   the steps comprising:
   flying the aircraft to approach the gantry means;
   flying the aircraft to temporarily adopt a generally horizontal in-flight thrust-supported position within said acquisition region;
   operating said control means to sense the position of said second complementary engagement means and to actuate said first and second actuation means to cause said first and second complementary engagement means to be engaged; and
   terminating the supporting thrust.

3. The method of retrieving an aircraft in a system for launching and/or retrieving an aircraft, said system including:
   (i) gantry means having a base portion for attachment to a surface station and a distal portion,
   (ii) a longitudinally extensible member pivotally mounted on said distal portion,
   (iii) first actuation means operable to effect extension and contraction of said extensible member,
   (iv) second actuation means operable to effect pivotal movement of said extensible member with respect to said distal portion
   (v) first complementary engagement means provided on the end region of said extensible member remote from the distal portion,
   (vi) an aircraft capable of hovering in a substantially stationary horizontal position with respect to said gantry means,
   (vii) second complementary engagement means provided on the aircraft in the region of its center of gravity adjacent the normal axis of the aircraft and being adapted for releasable engagment with said first complementary engagement means, (viii) control means for sensing the position of the second complementary engagement means when the aircraft is hovering in a predetermined acquisition region, and for operating said first and second actuation means to guide said first complementary engagement means into engagement with said second complementary engagement means:

the steps comprising:

flying the aircraft to temporarily adopt a generally horizontal in-flight thrust-supported position within said acquisition region;

operating said control means to cause said first and second complementary engagement means to be engaged;

maintaining a flight controllable condition of the aircraft;

actuating said first actuation means to draw the aircraft toward and locating it against the location means; and terminating the supporting thrust and flight controllable condition of the aircraft.

4. A system for launching and/or retrieving an aircraft said system including:

(i) gantry means having a base portion for attachment to a surface station and a distal portion, (ii) a longitudinally extensible member pivotally mounted on said distal portion, (iii) first actuation means operable to effect extension and contraction of said extensible member, (iv) second actuation means operable to effect pivotal movement of said extensible member with respect to said distal portion, (v) first complementary engagement means provided on the end region of said extensible member remote from the distal portion, (vi) an aircraft capable of hovering in a substantially stationary horizontal position with respect to said gantry means, (vii) second complementary engagement means provided on the aircraft in the region of its center of gravity adjacent the normal axis of the aircraft and being adapted for releasable engagement with said first complementary engagement means, (viii) control means for sensing the position of the second complementary engagement means when the aircraft is hovering in a predetermined acquisition region, and for operating said first and second actuation means to guide said first complementary engagement means into engagement with said second complementary engagement means, whereby for retrieval of the aircraft, said first complementary engagement means may be brought into releasable aircraft-carrying complementary engagement with said second engagement means, irrespective of the location of the aircraft within said acquisition region, to support a major portion of the weight of the aircraft, and the system being arranged such that a carried aircraft when released by disengagement of the engagement means can adopt an in-flight, self-supported position.

5. A system according to claim 4, for use with an aircraft having efflux means for effecting jet thrust supported flight, wherein said first complementary engagement means is directed generally downwardly and said second complementary engagement means is directed generally upwardly.

6. A system according to claim 4, arranged such that said predetermined acquisition region is at a flight level wherein re-ingestion of the jet efflux is at least reduced.

7. A system according to claim 4, wherein the gantry means is adapted for mounting on a surface vehicle, for example a naval vessel.

8. A system according to claim 7, wherein the gantry means extends, and the first complementary engagement means lies, in a position outboard of the vehicle.

9. A system according to claim 8, wherein the gantry means is movable between an inboard position in which the aircraft can be lifted from or deposited in a storage position and said outboard position.

10. A system according to claim 7, which includes stabilising means operable to maintain the position of the distal portion of the gantry means stationary in space.

11. A system according to claim 4, wherein the gantry means is adapted for mounting on an elevated fixed base.

12. A system according to claim 4, which includes location means against which the aircraft is drawn for substantially rigid location subsequent to carrying complementary engagement by the engagement means.

13. A system according to claim 4, which includes means to effect fluid supply to the carried aircraft.

14. A system according to claim 4, which includes alignment means for allowing positioning of the aircraft at a location within said predetermined acquisition region.

* * * * *